United States Patent [19]

Monzel et al.

[11] 4,214,796
[45] Jul. 29, 1980

[54] BEARING ASSEMBLY WITH MULTIPLE SQUEEZE FILM DAMPER APPARATUS

[75] Inventors: Fred J. Monzel, Loveland; Melvin Bobo, Cincinnati, both of Ohio

[73] Assignee: General Electric Company, Cincinnati, Ohio

[21] Appl. No.: 952,871

[22] Filed: Oct. 19, 1978

[51] Int. Cl.$^2$ .................. F16C 35/12; F16C 39/04
[52] U.S. Cl. .................. 308/26; 308/184 R; 415/113
[58] Field of Search .................. 308/9, 15, 26, 184 R, 308/184 A; 415/111–113, 170 R

[56] References Cited

U.S. PATENT DOCUMENTS

| | | | |
|---|---|---|---|
| 2,403,489 | 7/1946 | Birmann | 308/26 |
| 2,440,890 | 5/1948 | Birmann | 308/77 |
| 2,652,139 | 3/1972 | Memery | 308/187 |
| 3,357,757 | 12/1967 | Morley et al. | 308/184 R X |
| 3,499,691 | 3/1970 | Baier | 308/9 |
| 4,046,430 | 9/1977 | Buono et al. | 308/26 |

Primary Examiner—Frederick R. Schmidt
Attorney, Agent, or Firm—Donald W. Walk; Derek P. Lawrence

[57] ABSTRACT

An improved bearing assembly is provided for supporting a rotating shaft. The improvement is comprised of utilizing a resilient support means in combination with a multiple squeeze film damper apparatus. The damper apparatus provides a large damping force to suppress large vibrations and excessive radial shaft deflections in the event of operation with an abnormally high unbalanced shaft. The resilient support provides a soft spring system as a means for establishing and maintaining the critical rotor speed at a low speed condition, for centering the shaft during normal operation, and for allowing radial deflection during operation with an unbalanced shaft.

10 Claims, 3 Drawing Figures

BEARING ASSEMBLY WITH MULTIPLE SQUEEZE FILM DAMPER APPARATUS

CROSS REFERENCE TO RELATED APPLICATION

Reference is made to co-pending U.S. Pat. application Ser. No. 952,872, filed the same date as the present application and entitled "Bearing Assembly with Resilient Support Means".

BACKGROUND OF THE INVENTION

1. Field of the Invention

This invention relates to bearing assemblies for supporting rotating shafts and, more particularly, to an apparatus for controlling vibration in the event of abnormally high shaft unbalance.

2. Description of the Prior Art

Rotating shafts, and particularly rotating shafts in gas turbine engines, can become abnormally unbalanced while operating. For example, a high pressure turbine rotor in a gas turbine engine will become abnormally unbalanced in the event that a turbine blade is lost. The combination of abnormally high unbalance and a critical speed within the operating range of the rotating turbine shaft could result in potentially damaging vibration forces as well as excessive shaft deflections which may result in damaging rubs.

Prior art bearing assemblies control the shaft vibration characteristics by means of critical speed adjustments and damping. The critical speed is usually controlled by adjusting the flexibility of the various members which comprise the engine system, e.g. the rotating shaft itself, the bearing, support structure, etc. The vibration response at the critical speeds is often suppressed by means of a single squeeze film damper which usually comprises a quantity of oil contained within a small radial gap.

Although the prior art bearing assemblies are generally adequate for achieving smoothness in a moderately unbalanced system during normal operation, they are generally inadequate for an abnormally high unbalanced system. For example, when a prior art bearing assembly is employed with a high pressure turbine rotor in a gas turbine engine, and in the event a turbine blade is lost, the small gap associated with a single squeeze film damper provides a nonlinear hard spring response which tends to raise the critical frequency and negate the advantages derived from the damping. Increasing the size of the radial gap results in a softer spring rate, but the damping force is significantly reduced, tending to result in damaging rubs.

SUMMARY OF THE INVENTION

It is, therefore, an object of the present invention to provide a rotating shaft bearing assembly which suppresses large vibration forces in the event of abnormal unbalance operation.

It is a further object of the present invention to provide such a bearing assembly which prevents excessive shaft deflections during normal operation.

It is yet another object of the present invention to provide such a bearing assembly which achieves a large damping force while maintaining a relatively soft spring system.

Briefly stated, these objects, as well as additional objects and advantages which will become apparent from the following specification and the appended drawings and claims, are accomplished by the present invention which provides a bearing assembly for supporting rotating shaft. The bearing assembly is comprised of a supporting structure, a bearing, including an outer race surrounding the shaft, resilient support means connecting the bearing outer race to the supporting structure and means for providing a large damping force to suppress abnormally high unbalance forces and deflections within the shaft. The damping means is comprised of a multiple squeeze film damper apparatus which includes a pair of annular members surrounding the shaft and spaced axially apart to form an annular cavity therebetween. A plurality of nested annular sleeves also surrounds the shaft and is disposed within the annular cavity with the radially innermost sleeve being associated with the resilient support means and the radially outermost sleeve being associated with the supporting structure. The diameters of the sleeves vary from the radially innermost to the outermost to form annular spaces therebetween. A viscous fluid is supplied under pressure to each of the annular spaces.

DESCRIPTION OF THE PREFERRED EMBODIMENT

Figure 1:
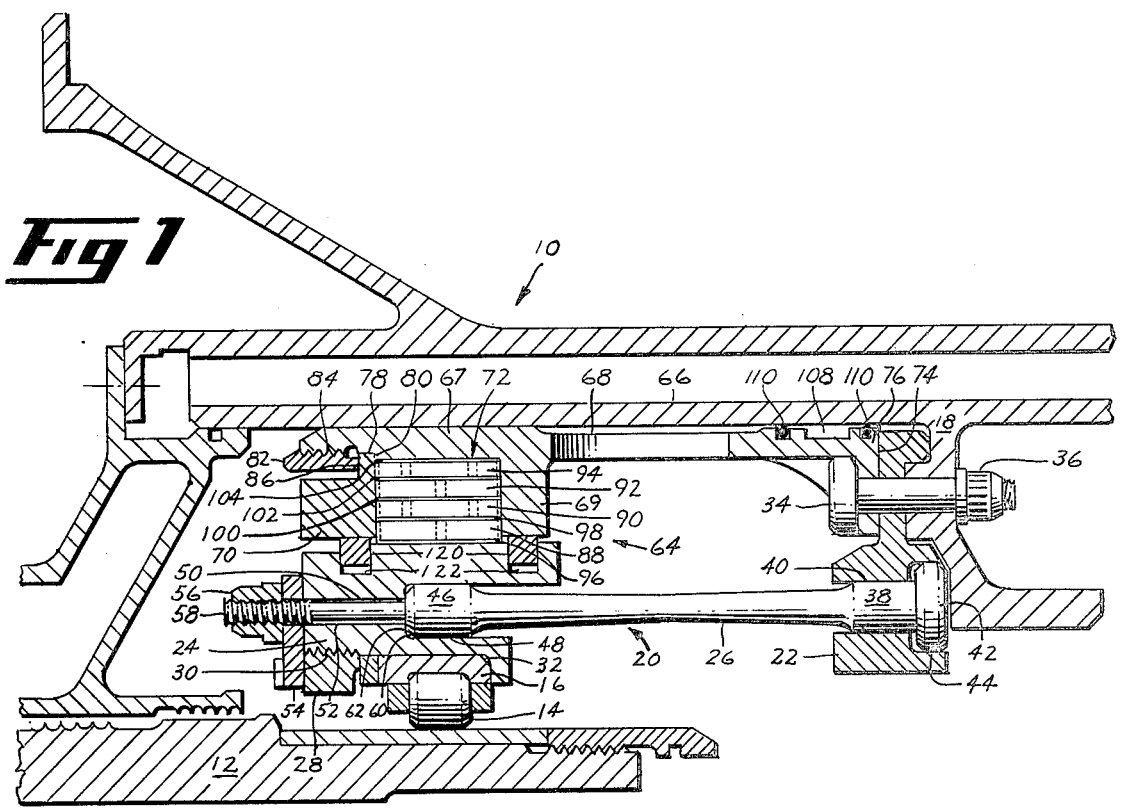
FIG. 1 is a fragmentary cross-sectional view of a portion of a gas turbine engine including one embodiment of the improved bearing assembly of the present invention.

Referring to FIG. 1, there is depicted a fragmentary cross section of a portion of a gas turbine engine shown generally as 10. The engine 10 may be of any type, for example a turbofan, a turbojet, a turboshaft, etc., and a detailed description of its major component parts and operation is not deemed to be essential for an understanding of the present invention.

A shaft 12, for example of a turbine rotor, is journaled for rotation within a bearing 14. The bearing 14 may be of any type, for example a roller bearing, and includes an outer race 16. The outer race 16 is resiliently connected by a resilient support means, shown generally as 20, to a generally stiff supporting structure 18, for example a bearing sump casing.

The resilient support means 20 is designed as a soft spring system in order to establish and maintain the critical speed of the rotor 12 at a low percentage of engine speed. The resilient support means 20 also keeps the shaft 12 centered during normal operation. For reasons which will hereinafter become apparent, the resilient nature of the support means 20 allows radial motion of the shaft 12 to occur.

The support means 20 of the present embodiment is a so-called "squirrel cage" comprised of an annular cage support housing 22, an annular bearing housing 24 and a plurality of circumferentially spaced apart and generally axially aligned contoured pins, one of which is shown as 26.

The bearing housing 24 is attached to the outer race 16 by means of an annular bearing retainer nut 28. The bearing retainer nut 28 is tightened against the outer race 16 utilizing threads 30 in the radial interior of the annular bearing housing 24. The initial tightening of the bearing retainer nut 28 puts pressure upon the left side (as viewed in FIG. 1) of the outer race 16, thereby forcing the outer race 16 to the right and into abutting engagement with an annular shoulder 32 in the bearing housing 24. Continued tightening of the bearing retainer nut 28 locks the outer race 16 in place with respect to the bearing housing 24 as is shown in FIG. 1.

The cage support housing 22 is attached to the supporting structure or sump casing 18 by a plurality of bolts and locknuts, a pair of which is shown as 34 and 36 respectively. The pins connect the cage support housing 22 to the bearing housing 24 (in a manner which will hereinafter be described) in order to provide the desired soft spring support for the bearing 14. In order to avoid unnecessary repetition, the manner of connecting only one pin to the two housings will be described. It is to be understood, however, that all of the pins are connected in the same manner.

The downstream end 38 of a pin 26 is secured by means of an interference press fit within an annular opening 40 extending axially through the cage support housing 22. (Downstream as used herein means the direction to the right as shown in FIG. 1). The tip of the downstream end 38 of the pin 26 includes a button 42 having an axial cross-sectional area which is larger than that of the annular opening 40 and which is disposed within an enlarged diameter opening 44 in the downstream side of the cage support housing 22. The button 42 acts as a positive mechanical stop by abutting against either the upstream side of the sump casing 18 or the downstream side of the cage support housing 22, to limit axial motion of the pin 26 in either direction. It also acts as a means to prevent migration or loss of the pin in the event of pin failure.

The upstream end 46 of the pin 26 is similarly secured by means of an interference press fit within an annular opening 48 extending axially through the bearing housing 24. The upstream end 46 of the pin 26 also includes an extension portion 50 of a diameter smaller than that of the rest of the pin 26. The pin extension portion 50 extends axially through an annular opening 52 in the bearing housing 24 and through an opening in an anti-rotational lockplate 54. A locknut 56 placed on the threaded end 58 of the pin extension portion 50 is tightened against the lockplate 54 and the bearing housing 24, thereby drawing the pin 26 to the left until an annular shoulder 60 on the pin 26 engages an annular seat 62 within the bearing housing 24 (as is shown in FIG. 1). The locknut 56, in addition to serving as a means for properly positioning the pin 26 within the bearing housing 24 and to retain the lockplate 54 in position, acts as a means to prevent the migration or loss of the pin in the event of pin failure.

The use of individual pins 26 to join the bearing housing 24 and the cage support housing 22 in the above-described manner results in lower pin stress for a given stiffness and rotor deflection. The pins are contoured to provide for constant stresses along the axial length of each pin when radial deflections are imposed upon the bearing housing 24. The lower pin stresses result in an increased capacity for accommodating larger rotor deflections (and therefore higher unbalances) without fatigue failure of the pins 26.

A multiple squeeze film damper apparatus, shown generally as 64, is disposed between the radial exterior of the resilient support means 20 and the radial interior of an annular structural member 66. The structural member 66 is attached to and forms a part of the sump casing 18. The damper apparatus 64 is comprised generally of a first annular member or damper housing 68 which, in conjunction with a second annular member or ring member 70 and a portion of the radial exterior of the bearing housing 24, forms an annular damper cavity shown generally as 72. The damper housing 68 is generally comprised of a cylinder 67 having a first annular flange member 69 extending radially inwardly therefrom. The radial exterior of the cylinder 67 generally engages the radial interior of the structural member 66 and is retained in place radially by means of an interference press fit. A second annular flange member 74 extends radially inwardly from the downstream end 76 of the cylinder 67 and is bolted to the sump casing 18 in order to prevent axial movement of the damper housing 68 with respect to the structural member 66.

The annular ring member 70 includes a radially outwardly extending annular flange portion 78 which abuts an annular shoulder 80 on the damper housing 68. An annular spanner nut 82 engages a set of threads 84 within the damper housing 68 and is tightened thereon in order to clamp the ring member 70 in the position as shown in FIG. 1. The spanner nut 82 is specifically designed with a flat portion 86 which engages the radial exterior of the ring member 70 in order to provide a uniform clamping force to keep the ring member 70 from shifting its position under an axial pressure force.

A plurality of nested annular sleeves (shown in the present embodiment as four such sleeves) 88, 90, 92 and 94 are disposed within the annular damper cavity 72. The sleeves are of a precise axial length so that when assembled within the damper cavity a minimal axial clearance exists between the sleeves and the radial walls of the damper cavity 72. In addition, each sleeve includes one or more very shallow projections 124 as is shown greatly enlarged in FIG. 3 (only one sleeve being depicted for clarity), creating axial end gaps in order to equalize the pressure on the downstream and upstream ends of the sleeve.

The radially innermost sleeve 88 is associated with the radial exterior of the bearing housing 24, forming an annular space 96 therebetween in a manner which will hereinafter become apparent. The diameters of the annular sleeves 88, 90, 92 and 94 vary from the radially innermost to the radially outermost so as to form annular spaces, 98, 100 and 102 therebetween. For example, the diameter of the radial exterior of sleeve 88 is slightly smaller than the diameter of the radial interior of sleeve 90 thereby forming annular space 98 therebetween. The radially outermost sleeve 94 is associated with the radial interior of the damper housing 68 thereby forming an annular space 104 therebetween.

Figure 2:
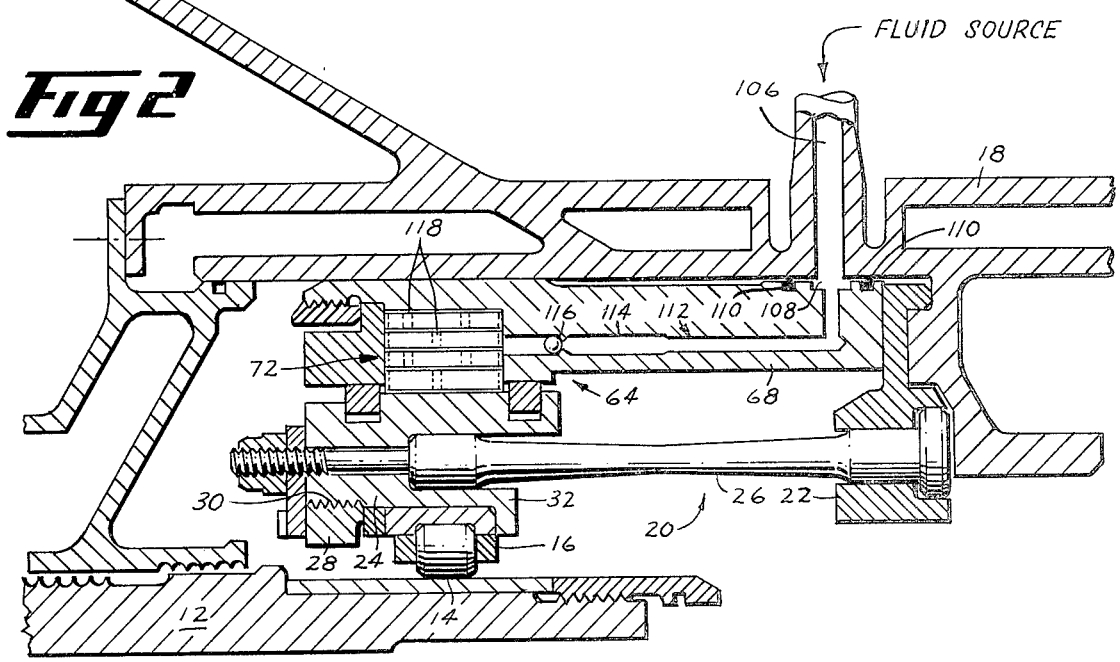
FIG. 2 is a fragmentary cross-sectional view of a different portion of the engine of FIG. 1.

As is best seen in FIG. 2, a source of viscous fluid under pressure (not shown) is connected (by means which will hereinafter be described) to the damper apparatus 64 in order to maintain a constant supply of pressurized fluid within the annular spaces 96, 98, 100, 102 and 104. The pressurized fluid is supplied via a first fluid conduit 106 disposed within the sump casing 18 to an annular fluid supply groove 108 formed between the radial exterior of the damper housing 68 and the sump casing 18. The use of an annular supply groove 108 eliminates the need for having a multiplicity of external feed lines. A pair of piston ring seals 110, one of which is located on either side of the supply groove 108, is provided in order to retard fluid leakage from the supply groove 108.

The pressurized fluid within the supply groove 108 flows into the damper cavity 72 via a second conduit 112 within the sump housing 68. The axial portion 114 of the second conduit 112 includes a means, for example check valve 116, for maintaining the pressurized fluid within the damper cavity 72 and to prevent fluid back flow out of the damper 64 during unbalance conditions. Although the foregoing description relates to a single conduit 112 for supplying the pressurized fluid from the supply groove 108 to the damper cavity 72, it should be understood that it may be desirable to have more than one such conduit circumferentially spaced apart in order to maintain a proper level of fluid within the damper cavity 72.

Figure 3:
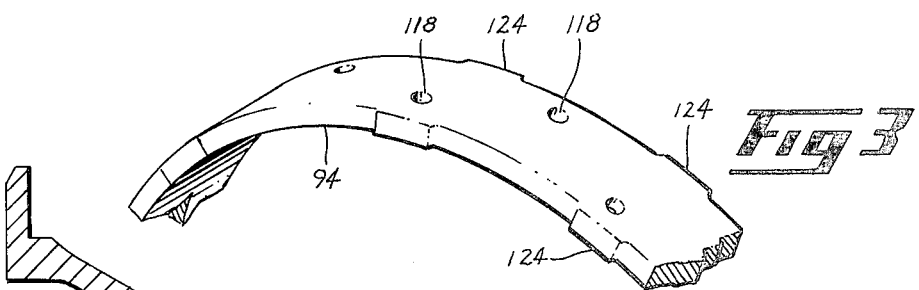
FIG. 3 is an enlarged perspective view of a portion of FIG. 1.

Referring now to FIGS. 1, 2 and 3, the pressurized fluid enters the damper cavity 72 from the axial portion 114 of conduit 112 and forms a hydrodynamic film within the annular spaces 96, 98, 100, 102 and 104. The movement of the fluid into the annular spaces is facilitated by a plurality of circumferentially spaced apertures or holes 118 within the annular sleeves 88, 90, 92 and 94. In the embodiment of the drawing, holes 118 in sleeve 94 are alternatingly disposed within two axially spaced apart circumferential rows. The holes 118 in sleeve 90 are similarly placed. The holes 118 in sleeves 92 and 88 are located along a single circumferential row. The holes are spaced in the described manner to provide progressive fluid communication between the annular spaces 96, 98, 100, 102, 104 in order to maintain an even distribution of the pressurized fluid within the annular spaces 96, 98, 100, 102 or 104.

Referring again to FIGS. 1 and 2, a pair of annular piston rings 120 or other suitable sealing elements, engage the radial interior of the damper housing 68 with an interference press fit. The piston rings 120 are fitted into a pair of annular grooves 122 within the radial exterior of the bearing housing 24, in order to retard the leakage of pressurized fluid from the damper cavity 72.

During normal operation, the resilient support means 20 serves as a soft mechanical spring system to keep the shaft 12 centered, as well as to establish the critical speed of the shaft 12 at a desired level usually below or low in the opening range of the engine. In the event that the shaft 12 undergoes a whirl type motion either from abnormally high unbalance forces or from operation at the critical speed, the pins 26 prevent the bearing housing 24 from rotating with the shaft 12. Thus, the bearing housing 24 experiences an orbiting type motion which, in turn, imposes an orbiting type motion upon the multiple squeeze film damper apparatus 64. The corresponding displacement squeezes the fluid film in each of the annular spaces 96, 98, 100, 102 and 104, thereby developing hydrodynamic forces therein.

The hydrodynamic forces developed are a function of fluid flow phenomena. It is the nature of the force that the smaller the annular space, the larger the force becomes for a given amount of displacement. Thus, by maintaining small individual annular spaces 96, 98, 100, 102 and 104, rather than one large clearance, the forces may be increased. It is also a characteristic that the forces may be increased by keeping minimal axial clearance between the sleeves 88, 90, 92 and 94 and the walls of the damper cavity 72, thereby constraining the fluid to flow primarily circumferentially, in compliance with the whirl type motion rather than as a free axial expulsion of fluid. The force may be separated into two components, the spring force being the component which is in the direction of the displacement and the damping force being the component which is normal to the direction of the displacement and opposes the whirl motion. It is the increase of this damping force which is desirable to suppress vibration. By increasing the damping force component the spring force component is also increased; however, the multiplicity of annular spaces 96, 98, 100, 102 and 104 combine to provide a larger total radial clearance, resulting in a generally lower overall spring constant. The lower spring constant combines with the previously described soft mechanical spring system to provide an overall soft support for the shaft 12.

From the foregoing description it can be seen that the present invention comprises an improved bearing assembly which provides a large damping force while maintaining a relatively soft spring system. It will be recognized by one skilled in the art that changes may be made to the abovedescribed invention without departing from the broad inventive concepts thereof. For example, the number of annular sleeves may be increased or decreased and the method of providing pressurized fluid to the damper cavity 72 may be varied. It is to be understood, therefore, that this invention is not limited to the particular embodiment disclosed, but it is intended to cover all modifications which are within the spirit and the scope of the invention as set forth in the appended claims.

What is claimed is:

1. An improved bearing assembly for supporting a rotating shaft, said assembly comprising:

a supporting structure;

a bearing surrounding said shaft and including an outer race, and resilient support means, comprising axially aligned pins surrounding said shaft for resiliently connecting said outer race to said supporting structure;

wherein the improvement comprises:

means surrounding said shaft and being disposed between a portion of said pins comprising said resilient support means and said supporting structure for providing a large damping force to suppress abnormally high unbalance forces and deflections within said shaft while maintaining a soft spring system during normal operation; wherein said damping means comprises a multiple squeeze film damper apparatus including:

a first and a second annular member surrounding said shaft, said members being spaced axially apart to form an annular cavity therebetween;

a plurality of nested annular sleeves surrounding said shaft and disposed within said cavity, said sleeves being of varying diameters to form annular spaces therebetween, the radially innermost of said sleeves being associated with said resilient support means and the radially outermost of said sleeves being associated with said supporting structure; and means for supplying viscous fluid under pressure to each of said annular spaces.

2. The improved bearing assembly as recited in claim 1 wherein:

said first annular member generally comprises a cylinder surrounding said shaft and engaging said supporting structure, said cylinder including an annular flange member extending radially inwardly therefrom; and said second annular member comprises a ring, said ring engaging said cylinder and being axially spaced apart from said flange member to form said cavity.

3. The improved bearing assembly as recited in claim 1 further including means for equalizing the pressure on the axial ends of said annular sleeves.

4. The improved bearing assembly as recited in claim 3 wherein said pressure equalizing means comprises a pluarlity of circumferentially spaced apart projections on the axial ends of said annular sleeves.

5. The improved bearing assembly as recited in claim 1 wherein said means for supplying said fluid to said annular spaces comprises conduit means for supplying said fluid to said cavity through one or more openings within one of said annular members.

6. The improved bearing assembly as recited in claim 5 wherein said conduit means is comprised of one or more generally axial conduits, each having a first end connected to a source of fluid under pressure and having a second end connected to one of said openings within said annular member.

7. The improved bearing assembly as recited in claim 6 wherein said first end of said one or more conduits is connected to an annular fluid supply groove, said supply groove being connected to a source of fluid under pressure.

8. The improved bearing assembly as recited in claim 6 wherein said one or more axial conduits includes means for maintaining said pressurized fluid within said cavity.

9. The improved bearing assembly as recited in claim 5 wherein said annular sleeves include a plurality of circumferentially spaced apart apertures to facilitate the movement of said fluid to said annular spaces.

10. In a bearing assembly for supporting a rotating shaft on a gas turbine engine, said bearing assembly including:
   a supporting structure;
   a bearing surrounding said shaft and including an outer race; and
   resilient support means surrounding said shaft for resiliently connecting said outer race to said supporting structure; wherein the improvement comprises a multiple squeeze film damper apparatus positioned between said resilient support means and said supporting structure including:
   a pair of annular members surrounding said shaft and spaced axially apart to form an annular cavity therebetween;
   a plurality of nested annular sleeves surrounding said shaft and disposed within said cavity, said sleeves being of varying diameters to form annular spaces therebetween, the radially innermost of said sleeves being associated with said resilient support means and the radially outermost of said sleeves being associated with said supporting structure; and
   means for supplying viscous fluid under pressure to each of said annular spaces.

* * * * *